United States Patent [19]
Mondragon, Jr.

[11] Patent Number: 5,575,908
[45] Date of Patent: Nov. 19, 1996

[54] SEWER SYSTEM WATER PURIFIER

[76] Inventor: Anastacio Mondragon, Jr., P.O. Box 604, Alcalde, N.M. 87511

[21] Appl. No.: 492,693

[22] Filed: Jun. 20, 1995

[51] Int. Cl.[6] ............................................. B01D 17/032
[52] U.S. Cl. ...................... 210/257.1; 210/258; 210/259; 210/265; 210/532.2
[58] Field of Search ................................. 210/532.2, 266, 210/257.1, 258, 259, 265, 195.1, 260

[56] References Cited

U.S. PATENT DOCUMENTS

| | | | |
|---|---|---|---|
| 988,391 | 4/1911 | Shillington | 210/266 |
| 1,058,458 | 4/1913 | Moore | 210/259 |
| 1,633,080 | 6/1927 | Engle | 210/266 |
| 2,239,612 | 4/1941 | Lawlor | 210/258 |
| 3,206,032 | 9/1965 | Nottingham et al. | 210/258 |
| 3,515,278 | 6/1970 | Wilson | 210/258 |
| 3,915,857 | 10/1975 | Olson | 210/257.1 |
| 3,933,641 | 1/1976 | Hadden et al. | 210/258 |
| 4,100,070 | 7/1978 | White et al. | 210/265 |
| 4,104,164 | 8/1978 | Chelton | 210/258 |
| 4,828,709 | 5/1989 | Houser et al. | 210/257.1 |
| 4,895,645 | 1/1990 | Zorich, Jr. | 210/258 |
| 4,904,387 | 2/1990 | Jordan | 210/259 |
| 4,909,948 | 3/1990 | Eichelberger, Sr. | 210/258 |
| 4,997,562 | 3/1991 | Warner | 210/259 |
| 5,112,483 | 5/1992 | Cluff | 210/266 |
| 5,360,556 | 11/1994 | Ball et al. | 210/258 |
| 5,374,352 | 12/1994 | Pattee | 210/259 |
| 5,382,363 | 1/1995 | Boylen | 210/532.2 |
| 5,407,562 | 4/1995 | Baldino | 210/257.1 |
| 5,441,631 | 8/1995 | Stegall, Sr. | 210/257.1 |

*Primary Examiner*—Cynthia L. Nessler

[57] ABSTRACT

A sewer system water purifier comprised of a first tank receiving a sewer line from a toilet through a top portion thereof. The first tank has an exit pipe extending outwardly thereof opposing the sewer line. A second tank has a drainage pipe therein coupling with the exit pipe extending outwardly of the first tank. The drainage pipe extends downwardly within the second tank and has a first bent portion paralleling a bottom thereof. The second tank has gravel therein. The second tank has an exit pipe extending outwardly thereof opposing the drainage pipe. A third tank has a drainage pipe therein coupling with the exit pipe of the second tank. The third tank has a water pump disposed thereon. The water pump has two pipes extending inwardly of the third tank. The water pump serves to pump water from the third tank to a toilet and a sprinkler system.

1 Claim, 4 Drawing Sheets

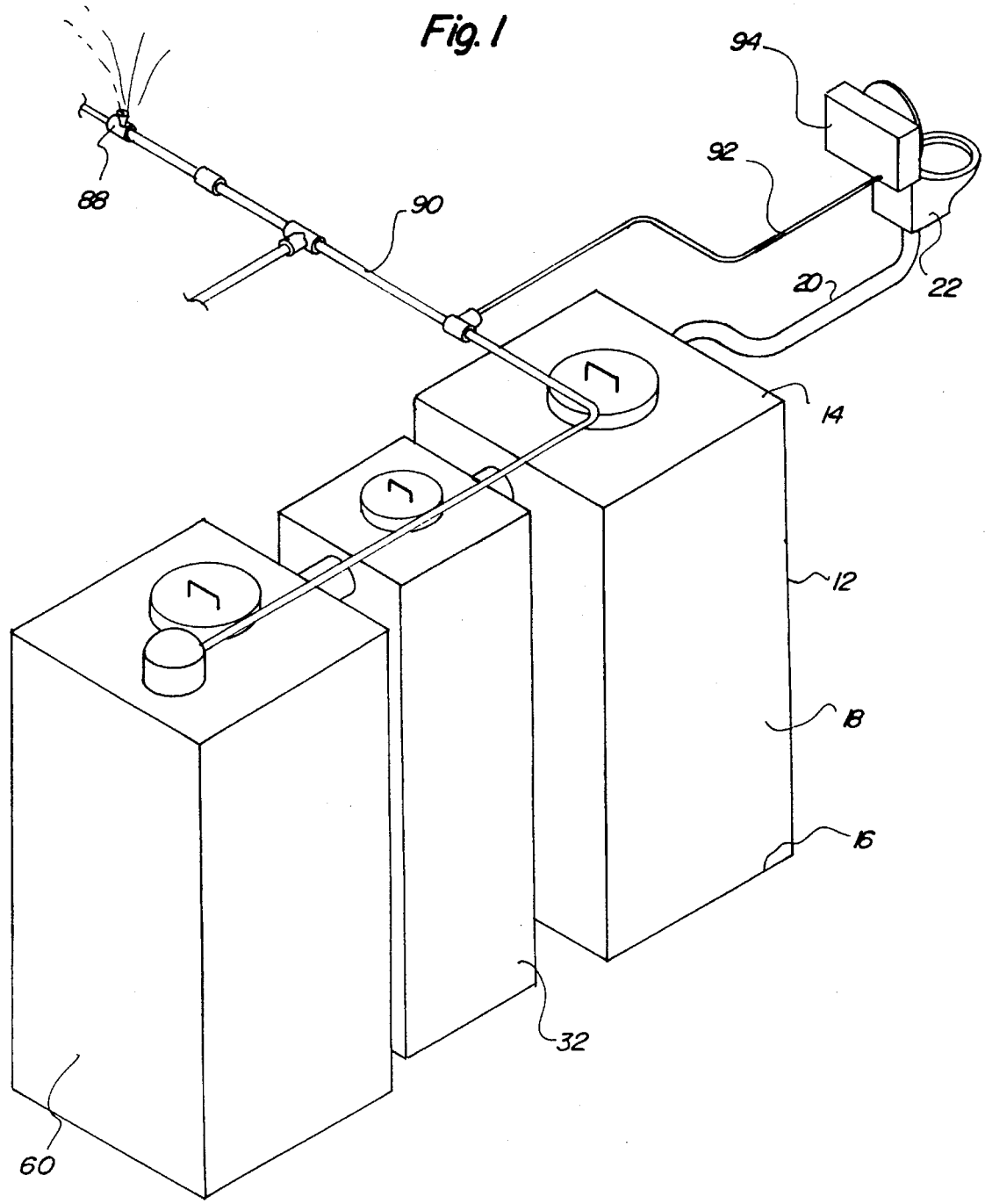

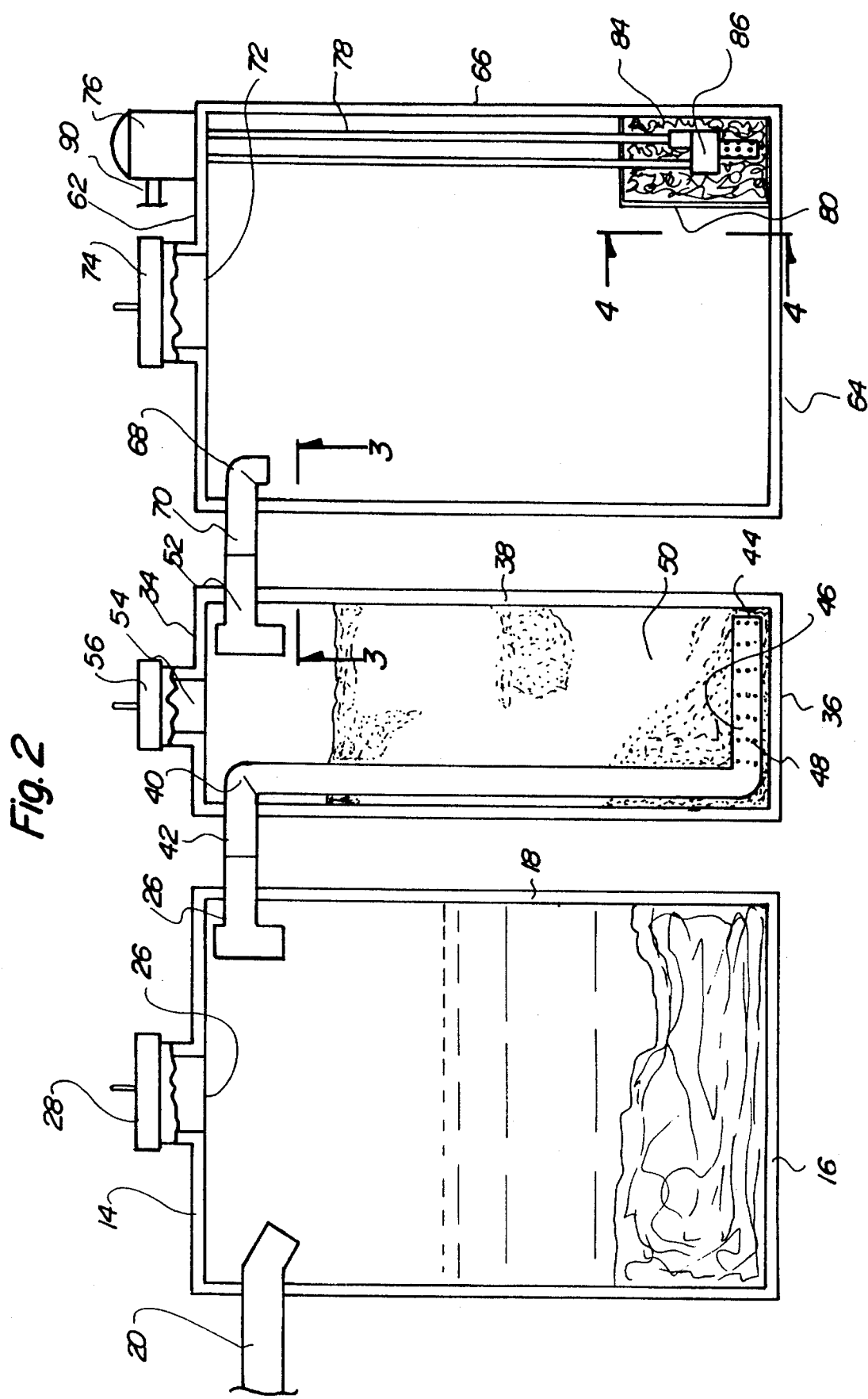

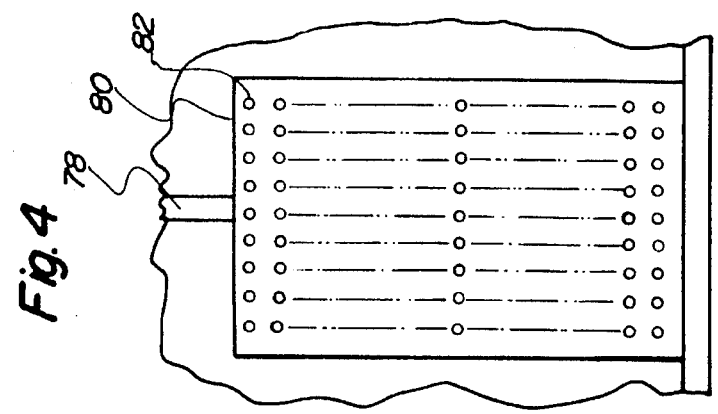
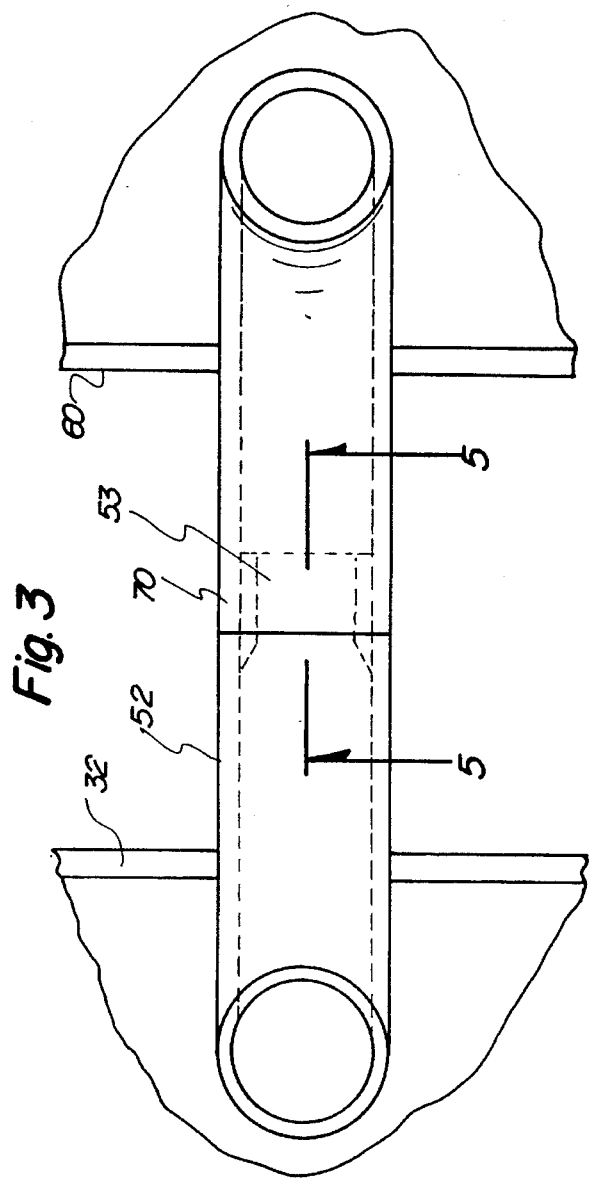
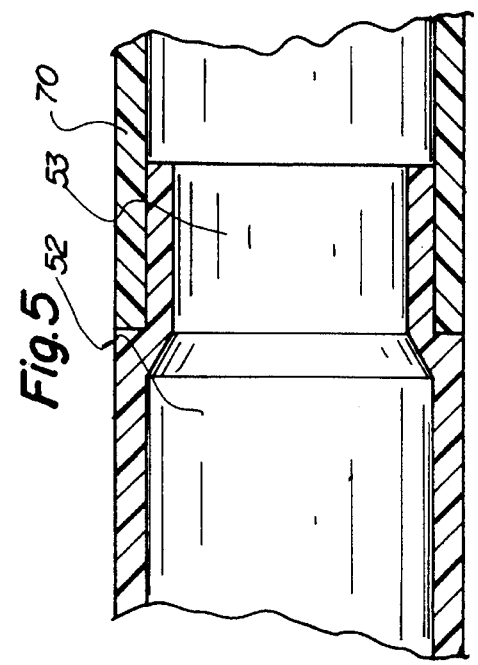

SEWER SYSTEM WATER PURIFIER

BACKGROUND OF THE INVENTION

1. Field of the Invention

The present invention relates to a sewer system water purifier and more particularly pertains to purifying toilet water to be reused in a toilet and for a sprinkler system for a lawn with a sewer system water purifier.

2. Description of the Prior Art

The use of water reclamation systems is known in the prior art. More specifically, water reclamation systems heretofore devised and utilized for the purpose of re-using gray water are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,084,920 to Kimball discloses a water recycling system.

U.S. Pat. No. 5,242,584 to Hoarau discloses an all-fluid tank with incorporated liquid collector.

U.S. Pat. No. 5,192,426 to DeCoster et al. discloses a water reclamation system for landscape irrigation.

U.S. Pat. No. 5,217,042 to Delle Cave discloses a residential waste water disposal system.

U.S. Pat. No. 5,254,246 to Rivelli et al. discloses a water reclamation system.

U.S. Pat. No. 5,106,493 to Mcintosh discloses a gray-water reclamation and reuse system.

While these devices fulfill their respective, particular objective and requirements, the aforementioned patents do not describe a sewer system water purifier for purifying toilet water to be reused in a toilet and for a sprinkler system for a lawn.

In this respect, the sewer system water purifier according to the present invention substantially departs from the conventional concepts and designs of the prior art, and in doing so provides an apparatus primarily developed for the purpose of purifying toilet water to be reused in a toilet and for a sprinkler system for a lawn.

Therefore, it can be appreciated that there exists a continuing need for new and improved sewer system water purifier which can be used for purifying toilet water to be reused in a toilet and for a sprinkler system for a lawn. In this regard, the present invention substantially fulfills this need.

SUMMARY OF THE INVENTION

In the view of the foregoing disadvantages inherent in the known types of water reclamation systems now present in the prior art, the present invention provides an improved sewer system water purifier. As such, the general purpose of the present invention, which will be described subsequently in greater detail, is to provide a new and improved sewer system water purifier and method which has all the advantages of the prior art and none of the disadvantages.

To attain this, the present invention essentially comprises a first tank having a top end, a bottom end, and four side walls therebetween. The first tank receives a sewer line from a toilet through a top portion of one of the four side walls. The first tank has an exit pipe extending outwardly of one of the side wall opposing the sewer line. The top end has an opening therethrough. The opening has a door removably secured therein. The device contains a second tank having a top end, a bottom end, and four side walls therebetween. The second tank has a drainage pipe therein. The drainage pipe has a first end and a second end. The first end couples with the exit pipe extending outwardly of the first tank. The drainage pipe extends downwardly within the second tank and having a first bent portion paralleling the bottom end. The first bent portion has a plurality of apertures formed therein. The second tank has gravel therein. The gravel fills up ¾ of the second tank. The second tank has an exit pipe extending outwardly of a side wall opposing the drainage pipe. The top end has an opening therethrough. The opening has a door removably secured therein. The device contains a third tank having a top end, a bottom end, and four side walls therebetween. The third tank has a drainage pipe therein. The drainage pipe has a first end coupled with the exit pipe of the second tank. The top end has an opening therethrough. The opening has a door removably secured therein. The top end has a water pump disposed thereon. The water pump has two pipes extending downwardly towards the bottom end. The bottom end has a housing disposed thereon. The housing has a plurality of apertures formed therein. The housing receives the ends of the two pipes therein. The housing has filtering means therein. The ends of the two pipes have a foot valve thereon. The water pump serves to pump water from the third tank to a toilet and a sprinkler system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sewer system water purifier which has all the advantages of the prior art water reclamation systems and none of the disadvantages.

It is another object of the present invention to provide a new and improved sewer system water purifier which may be easily and efficiently manufactured and marketed.

It is a further object of the present invention to provide a new and improved sewer system water purifier which is of durable and reliable construction.

An even further object of the present invention is to provide a new and improved sewer system water purifier which is susceptible of a low cost of manufacture with regard to both materials and labor, and which accordingly is then susceptible of low prices of sale to the consuming public, thereby making such a sewer system water purifier economically available to the buying public.

Still yet another object of the present invention is to provide a new and improved sewer system water purifier which provides in the apparatuses and methods of the prior art some of the advantages thereof, while simultaneously overcoming some of the disadvantages normally associated therewith.

Even still another object of the present invention is to provide a new and improved sewer system water purifier for purifying toilet water to be reused in a toilet and for a sprinkler system for a lawn.

Lastly, it is an object of the present invention to provide a new and improved sewer system water purifier comprised of a first tank receiving a sewer line from a toilet through a top portion thereof. The first tank has an exit pipe extending outwardly thereof opposing the sewer line. A second tank has a drainage pipe therein coupling with the exit pipe extending outwardly of the first tank. The drainage pipe extends downwardly within the second tank and has a first bent portion paralleling a bottom thereof. The second tank has gravel therein. The second tank has an exit pipe extending outwardly thereof opposing the drainage pipe. A third tank has a drainage pipe therein coupling with the exit pipe of the second tank. The third tank has a water pump disposed thereon. The water pump has two pipes extending inwardly of the third tank. The water pump serves to pump water from the third tank to a toilet and a sprinkler system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the sewer system water purifier constructed in accordance with the principles of the present invention.

FIG. 2 is a front elevated cross-sectional view of the present invention.

FIG. 3 is a cross-sectional view as taken along line 3—3 of FIG. 2.

FIG. 4 is a cross-sectional view as taken along line 4—4 of FIG. 2.

FIG. 5 is a cross-sectional view as taken along line 5—5 of FIG. 3.

The same reference numerals refer to the same parts through the various Figures.

DESCRIPTION OF THE PREFERRED EMBODIMENT

Figure 6:
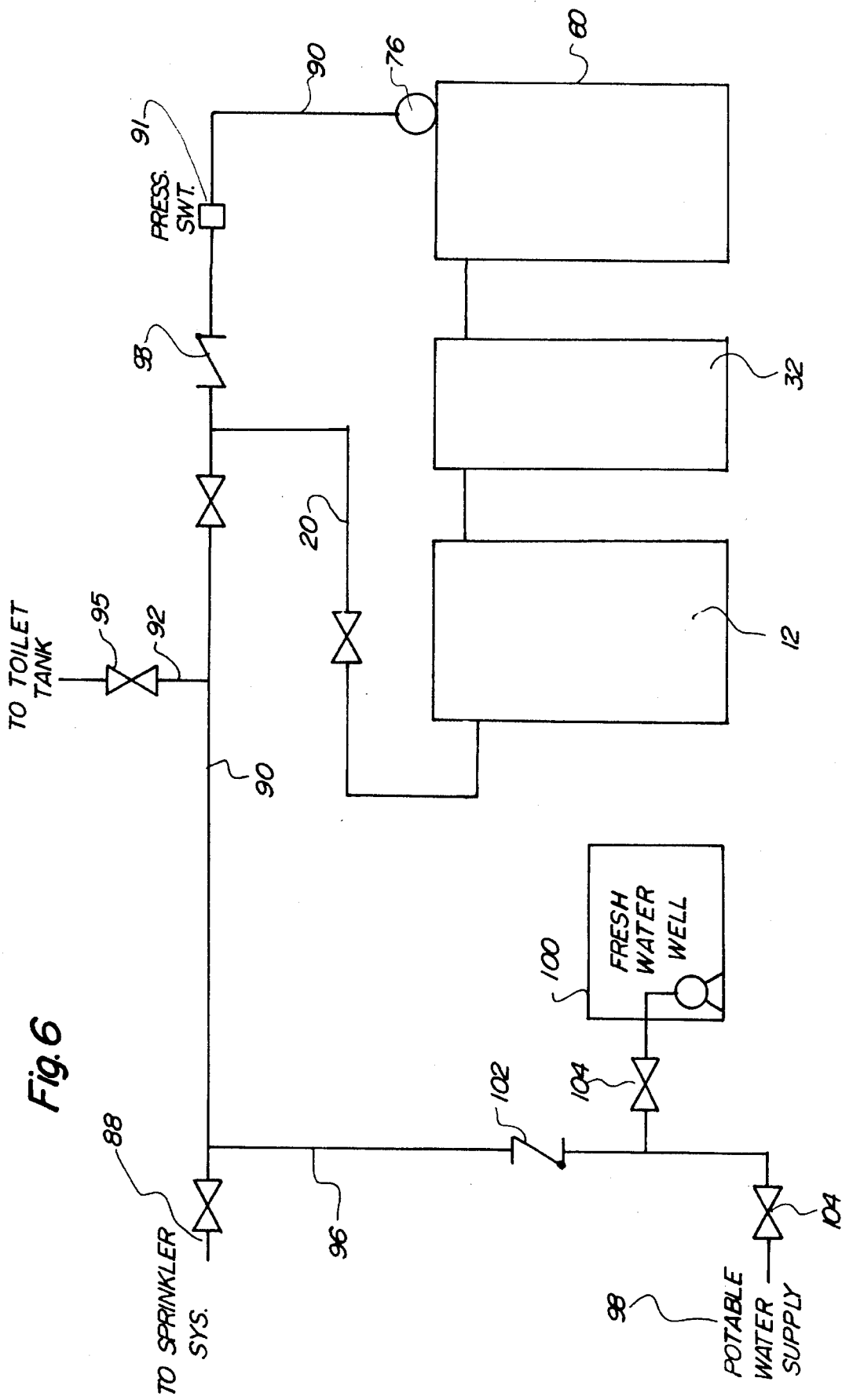
FIG. 6 is a schematical view of the present invention.

With reference now to the drawings, and in particular, to FIG. 1–6 thereof, the preferred embodiment of the new and improved sewer system water purifier embodying the principles and concepts of the present invention and generally designated by the reference number 10 will be described.

Specifically, it will be noted in the various FIGS. that the device relates to a sewer system water purifier for purifying toilet water to be reused in a toilet and for a sprinkler system for a lawn. In its broadest context, the device consists of a first tank, a second tank, and a third tank. Such components are individually configured and correlated with respect to each other so as to attain the desired objective.

The first component of the device 10 is a first tank 12. The first tank 12 has a top end 14, a bottom end 16, and four side walls 18 therebetween. The first tank 12 receives a sewer line 20 from a toilet 22 through a top portion of one of the four side walls 18. The first tank 12 has an exit pipe 24 extending outwardly of one of the side walls 18 opposing the sewer line 20. The top end 14 has an opening 26 therethrough. The opening 26 has a door 28 removably secured therein. Once the toilet 22 is flushed, the water and waste within the toilet 22 is drained out and through the sewer line 20 and into the first tank 12. Any solid waste will sink to the bottom end 16 of the first tank 12. Once enough waste water has been drained into the first tank 12, the water will then exit out of the exit pipe 24. The door 28 allows the first tank to be cleaned. The solid waste gathered at the bottom end 16 of the first tank 12 can be physically removed or it can be treated with chlorine or another chemical to dissolve the solid waste and also eliminate any unpleasant odors.

The second component of the device 10 is a second tank 32. The second tank 32 has a top end 34, a bottom end 36, and four side walls 38 therebetween. The second tank 32 has a drainage pipe 40 therein. The drainage pipe 40 has a first end 42 and a second end 44. The first end 42 couples with the exit pipe 24 extending outwardly of the first tank 12. The drainage pipe 40 extends downwardly within the second tank 32 and has a first bent portion 46 paralleling the bottom end 36. The first bent portion 46 has a plurality of apertures 48 formed therein. The second tank 32 has gravel 50 therein. The gravel 50 fills up ¾ of the second tank 32. The second tank 32 has an exit pipe 52 extending outwardly of a side wall 38 opposing the drainage pipe 40. The exit pipe 52 has a tapered portion 53 on an end thereof. The top end 34 has an opening 54 therethrough. The opening 54 has a door 56 removably secured therein. After the waste water exits the first tank 12, it travels through the drainage pipe 40 down within the second tank 32 and into the first bent portion 46 where the waste water permeates through the plurality of apertures 48. The waste water is then travels upwardly through the gravel 50 where it is filtered of impurities. The gravel 50 is similar to gravel used in familiar filter tanks. Once the waste water has travelled through the gravel 50 it exits out of the second tank through the exit pipe 52. The door 56 allows the gravel 50 to be properly treated and cleaned to kill bacteria and odors.

The last component of the device 10 is a third tank 60. The third tank 60 has a top end 62, a bottom end 64, and four side walls 66 therebetween. The third tank 60 has a drainage pipe 68 therein. The drainage pipe 68 has a first end 70 coupled with the tapered portion 53 of the exit pipe 52 of the second tank 32. The top end 62 has an opening 72 therethrough. The opening 72 has a door 74 removably secured therein. The top end 62 has a water pump 76 disposed thereon. The water pump 76 has two pipes 78 extending downwardly towards the bottom end 64. The bottom end 64 has a housing 80 disposed thereon. The housing 80 has a plurality of apertures 82 formed therein. The housing 80 receives the ends of the two pipes 78 therein. The housing 80 has filtering means therein. The filtering means could be comprised of a carbon filament 84 used to filter out and kill bacteria. The ends of the two pipes 78 have a foot valve 86 thereon. The water pump 76 serves to pump water from the third tank 60 to the toilet 22 and a sprinkler system 88. Once the waste water exits through the exit pipe 52 of the second tank 32, it enters into the third tank 60 via the drainage pipe 68. The waste water enters into the housing 80 through the plurality of apertures 82 therein. The waste water is further filtered by the carbon filament 84 and is then pumped up through the foot valve 86 and up to the water pump 76 to be distributed accordingly. A pipe 90 is coupled with the water pump 76. The pipe 90 has an end portion coupled to the sprinkler system 88. The pipe 90 is equipped with a pressure control switch 91 to control the amount of water from exiting the third tank 60. The pipe 90 also has a one-way valve 93 to stop the flow of waste water from entering the third tank 60. The pipe 90 has a first extension 92. The first extension 92 couples with a reservoir tank 94 for the toilet 22. The first extension 92 is equipped with a shut off valve 95 to stop the flow of water when necessary. The first extension serves to bring back filtered water to be used again in the toilet 22. The pipe 90 has a second extension 96 coupled with a portable water supply 98 or a fresh water well 100. The second extension 96 is equipped with a one-way valve 102 to prevent any filtered water from entering into the portable water supply 98 or the fresh water well 100. The second extension is equipped with a shut off valve 104 to stop the flow of water when cleaning the device 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A sewer system water purifier for purifying toilet water to be reused in a toilet and for a sprinkler system for a lawn comprising, in combination:

a first tank having a top end, a bottom end, and four side walls therebetween, the first tank receiving a sewer line from a toilet through a top portion of one of the four side walls, the first tank having an exit pipe extending outwardly from one of the side walls opposing the sewer line thus also located through a top portion of one of the four side walls, the top end having an opening therethrough, the opening having a door removably secured therein, whereby once the toilet is flushed, the water and waste within the toilet is drained out and through the sewer line and into the first tank such that any solid waste sinks to the bottom end of the first tank for physical removal and further the water exits out of the exit pipe when enough waste water has been drained into the first tank;

a second tank having a top end, a bottom end, and four side walls therebetween, the second tank having a drainage pipe therein, the drainage pipe having a first end and a second end, the first end coupling with the exit pipe extending outwardly of the first tank, the drainage pipe extending downwardly within the second tank and having a first bent portion paralleling the bottom end, the first bent portion having a plurality of apertures formed therein, the second tank having gravel therein, the gravel filling up ¾ of the second tank, the second tank having an exit pipe extending outwardly of a side wall opposing the drainage pipe with a tapered portion on an end thereof, the top end having an opening therethrough, the opening having a door removably secured therein for allowing the gravel within the second tank to be properly treated and cleaned, whereby after the waste water exits the first tank, it travels through the drainage pipe down within the second tank and into the first bent portion where the waste water permeates through the plurality of apertures after which the waste water travels upwardly through the gravel where it is filtered of impurities and then exits out of the second tank through the exit pipe;

a third tank having a top end, a bottom end, and four side walls therebetween, the third tank having a drainage pipe therein, the drainage pipe having a first end coupling with the exit pipe of the second tank, the top end having an opening therethrough, the opening having a door removably secured therein, the top end having a water pump disposed thereon, the water pump having two pipes extending downwardly towards the bottom end, the bottom end having a housing disposed thereon, the housing having a plurality of apertures formed therein, the housing receiving ends of the two pipes therein, the housing having carbon filament therein, the ends of the two pipes having a foot valve thereon, the water pump serving to pump water from the third tank to a toilet and a sprinkler system, whereby once the waste water exits through the exit pipe of the second tank, the water enters into the third tank via the drainage pipe whereupon the water enters the housing via the apertures at which time the water is filtered and pumped up through the foot valve and up to the water pump; and a pipe coupled with the water pump of the third tank with a pressure control switch to control the amount of water exiting the third tank and a one way valve to prevent water from entering the third tank, the pipe having an end portion coupled to the sprinkler system, a first extension coupled with a reservoir tank of a toilet with the first extension having a shut off valve to stop flow of water when necessary, a second extension coupled with a potable water supply wherein the second extension is equipped with a one-way valve to prevent any filtered water from entering into the potable water supply, and a third extension coupled with a fresh water well with the third extension being equipped with a one-way valve to prevent any filtered water from entering into the fresh water well.

\* \* \* \* \*